United States Patent [19]

Sellers

[11] Patent Number: 5,669,004
[45] Date of Patent: Sep. 16, 1997

[54] REDUCING POWER USAGE IN A PERSONAL COMPUTER

[75] Inventor: Charles A. Sellers, Houston, Tex.

[73] Assignee: Compaq Computer Corporation, Houston, Tex.

[21] Appl. No.: 640,989

[22] Filed: Apr. 2, 1996

Related U.S. Application Data

[63] Continuation of Ser. No. 301,664, Sep. 7, 1994, abandoned.

[51] Int. Cl.$^6$ ............................................. G06F 1/32
[52] U.S. Cl. ........................ 395/750.06; 395/750.01
[58] Field of Search ............................. 395/750, 550; 364/707

[56] References Cited

U.S. PATENT DOCUMENTS

| | | | |
|---|---|---|---|
| 4,409,665 | 10/1983 | Tubbs | 395/750 |
| 4,649,373 | 3/1987 | Bland et al. | 340/365 R |
| 4,755,707 | 7/1988 | Nakaya et al. | 310/334 |
| 5,148,380 | 9/1992 | Lin et al. | 395/750 |
| 5,163,153 | 11/1992 | Cole et al. | 395/750 |
| 5,175,845 | 12/1992 | Little | 395/550 |
| 5,218,704 | 6/1993 | Watts, Jr. et al. | 395/750 |
| 5,231,380 | 7/1993 | Logan | 340/706 |
| 5,247,655 | 9/1993 | Khan et al. | 395/750 |
| 5,249,298 | 9/1993 | Bolan et al. | 395/750 |
| 5,255,341 | 10/1993 | Nakajima | 395/2 |
| 5,276,890 | 1/1994 | Arai | 395/750 |
| 5,355,503 | 10/1994 | Soffel et al. | 395/750 |
| 5,369,443 | 11/1994 | Woodham | 395/750 |
| 5,369,771 | 11/1994 | Gettel | 395/750 |
| 5,371,693 | 12/1994 | Nakazoe | 395/750 |
| 5,396,443 | 3/1995 | Mese et al. | 395/750 |
| 5,404,541 | 4/1995 | Hirosawa et al. | 395/750 |
| 5,408,668 | 4/1995 | Tornai | 395/750 |
| 5,428,790 | 6/1995 | Harper et al. | 395/750 |

FOREIGN PATENT DOCUMENTS

| | | |
|---|---|---|
| 00488384 | 6/1992 | European Pat. Off. . |
| 5046295 | 2/1993 | Japan . |
| 5303455 | 11/1993 | Japan . |
| 6119090 | 4/1994 | Japan . |
| 2 235 797 | 3/1991 | United Kingdom . |

OTHER PUBLICATIONS

European Search Report, EPO No. 95 30 6256, Compaq Computer Corporation, pp. 1–4 (Jun. 18, 1996).
IBM Technical Disclosure Bulletin, *Personal Computer Environmental Control Via a Proximity Sensor*, vol. 36, No. 8, pp. 343–345 (Aug. 1993).
"Kynar Piezo Film Technical Manual", Penwalt, 1987.

*Primary Examiner*—Ayaz R. Sheikh
*Attorney, Agent, or Firm*—Fish & Richardson P.C.

[57] ABSTRACT

Power usage in a personal computer is reduced by repetitively performing the following sequence of steps: a. generate a wake-up signal in connection with a user beginning to interact with the computer; b. in response to the wake-up signal, switch at least a portion of the computer into a more fully powered mode; and c. keep the portion of the computer in the more fully powered mode only as long as the user is delivering input to the computer, and thereafter immediately switch the portion of the computer into a less fully powered mode. A detector issues a wake-up signal when a user begins to interact with the computer; and control circuitry connected to the sensor switches between the more fully powered mode and the less fully powered mode. The sensor may be mounted in a keyboard that includes an array of keys, and a sensor mounted in a position to detect use of the keyboard even when the keyboard is in an unpowered state.

21 Claims, 3 Drawing Sheets

REDUCING POWER USAGE IN A PERSONAL COMPUTER

This is a continuation of application Ser. No. 08/301,664, filed Sep. 7, 1994, now abandoned.

BACKGROUND

This invention relates to reducing power usage in a personal computer.

In a laptop computer, for example, one scheme to lower power usage (to make the battery last longer before recharging) shuts off the display and the hard-drive motor and switches the microprocessor into a sleep mode if no key has been pressed for a preset time-out period, and turns them on again as soon as a key is next pressed. Additional power can be saved by having the keyboard control circuit operate only periodically, rather than continually, as it watches for a key to be pressed. If a key is pressed after the microprocessor has been asleep or the disk-drive motor has been off, there is a delay before the microprocessor or the disk drive is fully operable and the computer is again ready to interact with the user.

SUMMARY

In general, in one aspect of the invention, power usage in a personal computer is reduced by repetitively performing the following sequence of steps: a. generate a wake-up signal in connection with a user beginning to interact with the computer; b. in response to the wake-up signal, switch at least a portion of the computer into a more fully powered mode; and c. keep the portion of the computer in the more fully powered mode only as long as the user is delivering input to the computer, and then switch the portion of the computer into a less fully powered mode.

Implementations of the invention may include the following features. The wake-up signal may be generated in response to sensing an action by the user. The action being sensed may be the user touching an input device of the computer; or the user coming into proximity with the computer; or the user speaking or otherwise making a noise. The sensing may be done by detecting a voltage generated by a piezoelectric device. The input device may be a keyboard, or a track ball or a mouse, or a touch pad or a touch screen. The less fully powered mode may comprise delivering a reduced level of power (or no power) to a keyboard control circuit of the kind which converts keypresses to key codes; or delivering no power to controller integrated circuits, discrete logic devices, or driver circuits.

While the portion of the computer is in the less fully powered mode, some components of the computer may be maintained at full power until a time-out period has elapsed and then the power to those components may be reduced until the wake-up signal is generated. The components maintained at full power may be those that exhibit a delay when powered up before they are operational, e.g., a main microprocessor, or a hard disk motor, or a display screen.

In general, in another aspect, the invention features the apparatus for reducing power usage. The apparatus includes a detector which issues a wake-up signal when a user begins to interact with the computer. Control circuitry is connected to the sensor and switches at least a portion of the computer into a more fully powered mode in response to the wake-up signal, and keeps the portion of the computer in the more fully powered mode only as long as the user is delivering input to the computer, and then switches the portion of the computer to a less fully powered mode.

Implementations of the invention may include the following features.

The detector may be comprised of a sensor mounted on the computer. The sensor may be comprised of a sound sensor, or a temperature sensor, or a strain sensor. The sensor may be a piezoelectric sensor mounted, e.g., in a keyboard of the computer, in a position near one of the keys.

In general, in another aspect, the invention features a keyboard of the kind that may be in a powered state in which keypresses are detected by keyboard driver circuitry or in an unpowered state in which keypresses are not detected by keyboard driver circuitry. The keyboard includes an array of keys, and a sensor mounted in a position to detect use of the keyboard even when the keyboard is in the unpowered state.

Other advantages and features of the invention will become apparent from the following description and from the claims.

DESCRIPTION

Figure 1:
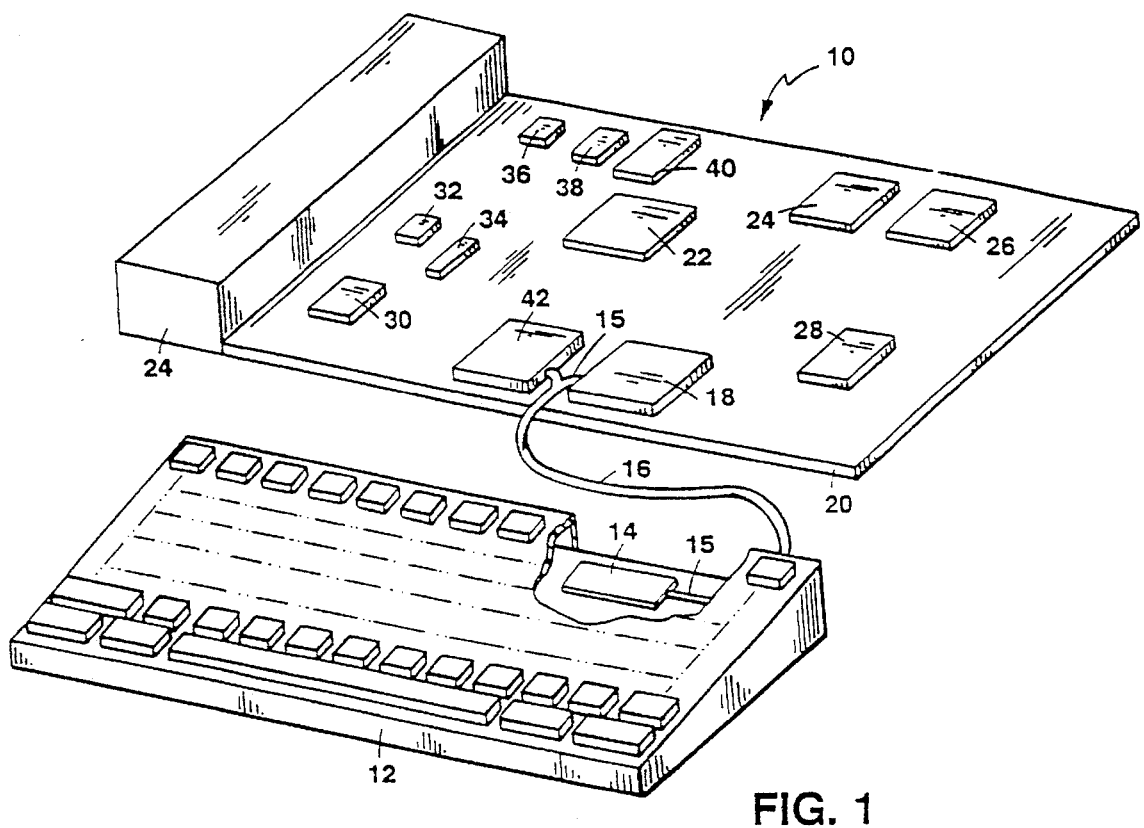
FIG. 1 is a perspective view of parts of a personal computer.

Referring to FIG. 1, to save power in a personal computer 10, a keyboard 12 is fitted with a piezoelectric sensor 14 (e.g., of the kind made from Kynar Piezo Film and available from Pennwalt in Philadelphia, Pa.). Keyboard 12 may be free standing or integrated into the case of a portable personal computer. The sensor is connected via additional wires 15, held within the usual keyboard cable 16, to a power control circuit 18 mounted on a motherboard 20 housed within the computer's "box" (not shown in FIG. 1). The power control circuit 18 controls delivery of power from a power source 24 (e.g., a battery, or a power converter fed from a wall outlet) to components on the motherboard and to other power using devices (e.g., a monitor and disk drive motors—not shown in FIG. 1). As part of its functions, the power control circuit 18 performs the usual steps of reducing power to the main microprocessor 22, the monitor, and the disk drive motors when the computer enters a "sleep" mode, and returning power to normal when the sleep mode ends. In the invention, the power control circuit also reduces (in some cases to zero) the power delivered to at least some of the components and devices whenever the user is not actively using the keyboard. Circuit 18 then promptly switches to delivering full power to those components when the user is actively using the keyboard (e.g., stroking keys).

The components on the motherboard 20 which may receive reduced, or even zero, power during periods of inactivity may include peripheral controllers and system controllers in the form of ASICs (application specific integrated circuits) 24, 26, 28, discrete logic components 30, 32, 34, and a variety of passive discrete components 36, 38, 40 (resistors, capacitors, inductors).

Figure 2:
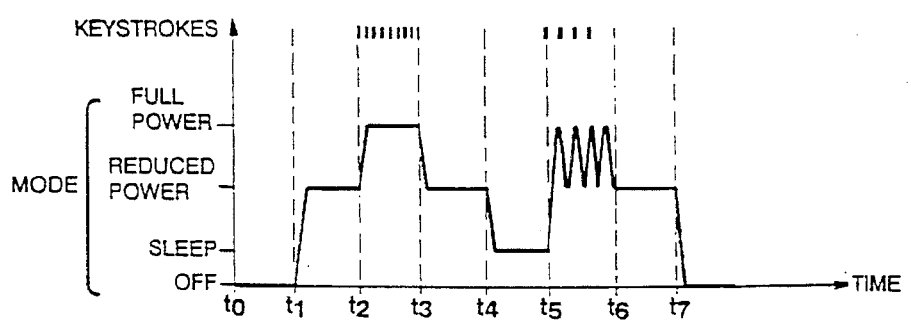
FIG. 2 is a timing diagram.

Referring to FIG. 2, to save power, the power control circuit governs the mode of operation in accordance with user activity, e.g., keystrokes, in a way illustrated by the following example. The computer begins in the off mode at time t0. At time t1 the computer is switched on and is placed in the reduced power mode in which components which require a period of time to come up to full operation (disk drive motors, monitor, main microprocessor) are driven to full power, while other components which can respond almost immediately to being turned on are driven at reduced (or zero) power. In the reduced power mode, the computer is ready to respond essentially immediately to any keystroke or other user activity by switching to full power mode, but is drawing less power than it would in full power mode. At time t2 the user presses a key. This causes the piezoelectric sensor to generate a voltage across its wires. The voltage is detected by the power control circuitry, which immediately switches the computer operation to full power mode. (Among other things, this turns on a keyboard control circuit 42 (FIG. 1) quickly enough to enable it to capture the code of the stroked key in the usual way. It also causes other components and devices (previously receiving reduced or zero power) to receive full power so that they are ready to react depending on the meaning of the stroked key. Keyboard control circuit 42 provides power to the typical keyboard switch matrix via, e.g., 28 lines contained in the keyboard cable, and detects, in the usual way, which key is stroked by analyzing the combination of signals which result on the 28 lines when a key is pressed.

In the period from t2 to t3, additional keys are stroked in rapid enough succession so that the delays between keystrokes are quite brief. The power control circuit includes logic (described below) which enables it to determine when the user has stopped active use of the keyboard, e.g., at or slightly later than time t3. As soon as the determination has been made, the power control circuit returns the computer to reduced power mode.

Also beginning at the time when inactivity is first determined by the power control circuit, a timer is started as a basis for triggering a sleep mode of the kind provided by many Intel microprocessors, and by software-based power saving schemes. Upon each key press, the timer is reset. When the timer times out, e.g., at time t4, the power control circuit switches the computer into the sleep mode. In sleep mode, power is typically reduced (even to zero) to the monitor, the hard disk motors, and reduced to the main microprocessor to keep it "alive" but not fully operational. When a key is subsequently pressed, at time t5, the computer would be switched to the full power mode. The computer would then switch back and forth between reduced power and full power modes as activity stopped and started. In one scheme the power control circuit could switch to full power upon each keystroke and switch back to reduced power immediately after each keystroke even when keystrokes appear in rapid succession, as illustrated in the period between t5 an t6. At time t7 the computer has been shut off.

Figure 3:
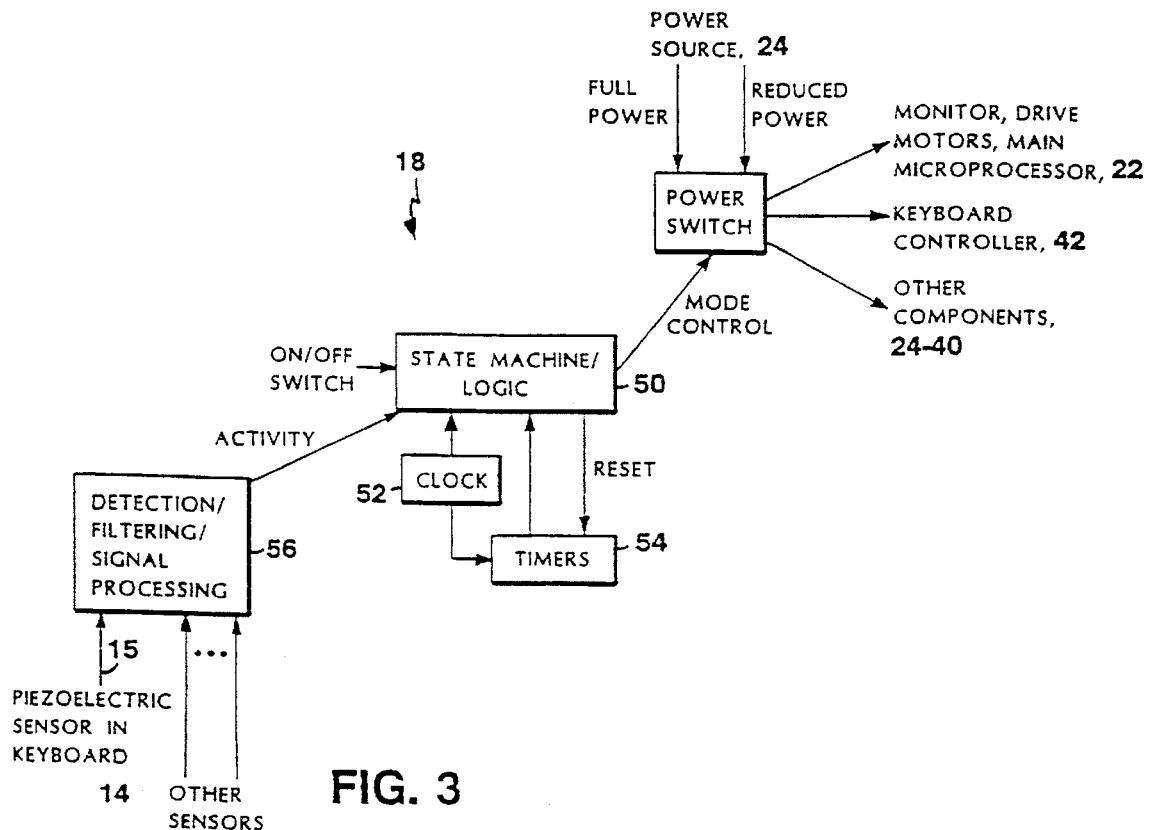
FIG. 3 is a functional block diagram of a power control circuit.

Referring to FIG. 3, the power control circuit includes a state machine with logic 50 which keeps track of the off/sleep/full power/reduced power mode of the computer based on signals from an on/off switch, a clock 52, time out signals from timers 54 driven by the clock, and activity signals from a detection/filtering/signal processing element 56. Element 56 detects signals from the keyboard sensor 14 and possibly from sensors at other locations on the computer, filters the detected signals, and performs signal processing to develop the activity signals. The state machine and logic 50 apply appropriate algorithms based on the current state, the activity signals, the clock, and the timers to determine the next state (i.e., mode).

A wide variety of algorithms could be applied by the state machine and logic 50. In one simple approach, each keystroke would result in an activity signal and trigger the start of a brief timer. If another keystroke activity signal appears before the timer times out, the full power mode is continued. Otherwise the computer is returned to the reduced power mode and the power control circuit waits for another keystroke. In another approach, the running average number of keystroke activity signals appearing in some time period (e.g., ten seconds) is used as an indication of continued active use. The object of any algorithm would be to take advantage of the power savings afforded by the reduced power and sleep modes. As noted above, it may even be possible not to apply any logic to determine if keyboard activity is continuing, but rather simply to enter reduced power mode immediately after each key stroke and enter full power mode immediately upon each keystroke.

Figure 4:
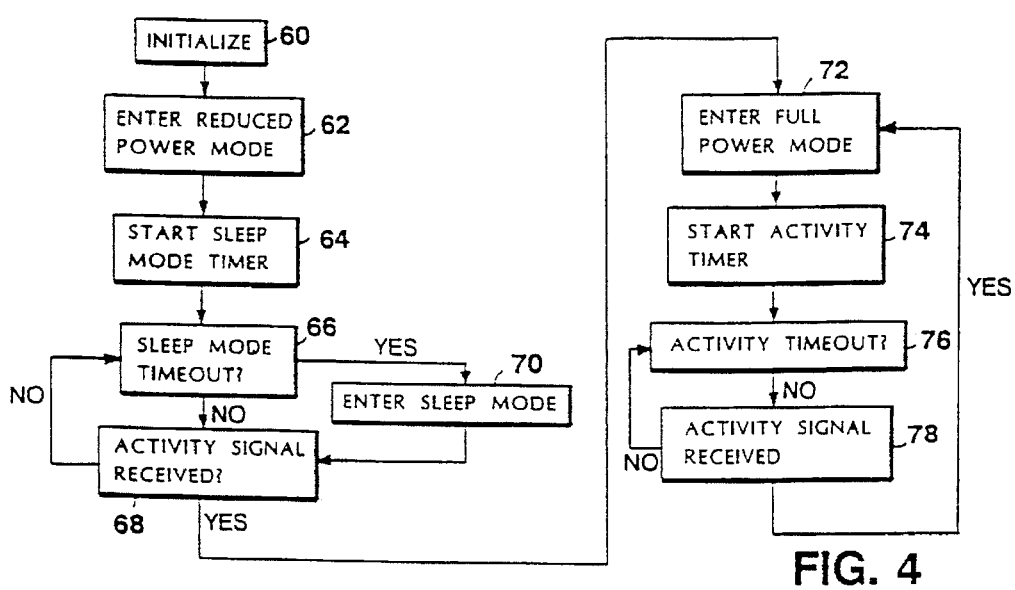
FIG. 4 is a flow chart of a power control process.

Referring to FIG. 4, when the computer is turned on, the state machine and logic 50 is initialized 60 and enters the reduced power mode 62. The sleep mode timer is started 64. Then, if the sleep mode timer times out 66 before an activity signal is received 68, sleep mode is entered 70. Otherwise, when the activity signal is received, full power mode is entered 72. Once sleep mode is entered, the system waits for an activity signal to be received 68. After entering full power mode, the activity timer is started 74 (in the case where such a timer is used). If the activity timer times 76 out before an activity signal is received 78, reduced power mode is again entered and the cycle repeats. Otherwise the computer enters full power mode.

The choice of sensors, their locations on the computer, and the signal processing and algorithms applied to the signals received from them may vary widely to achieve a variety of features. The piezoelectric sensor, for example, is sensitive to sound, stress, and heat, so it is not necessary to provide a sensor surface under each key of the keyboard. Only a small single sensor need be placed in close enough proximity to the keys to be triggered by keyboard use.

Because the sensor would be sensitive even to the presence of a person near the computer (because of heat or noise generated by the person), it could be used to cause the computer to switch from sleep mode to reduced power mode or from reduced power mode to full power mode and back again when a person approaches or walks away from the computer. On the other hand, when the person is using the computer, it may be annoying (or wasteful of power) to have the computer react to anything other than the use of the keyboard. The filters and signal processors in element 56 may be used to analyze the nature of the sensor signals being received, and the state machine and logic 50 could be arranged to react accordingly. In addition, the user could be provided with a software-based user interface that enables him to control the operation of the power control circuit. For example, the user on one occasion may tell the power control circuit to be sensitive only to actual keystrokes, while on another occasion may tell it to be sensitive to noises and heat in the room (in effect telling the computer to enter sleep mode because he is leaving the room, but to enter reduced power mode when it "hears" him return to the room).

Figure 5:
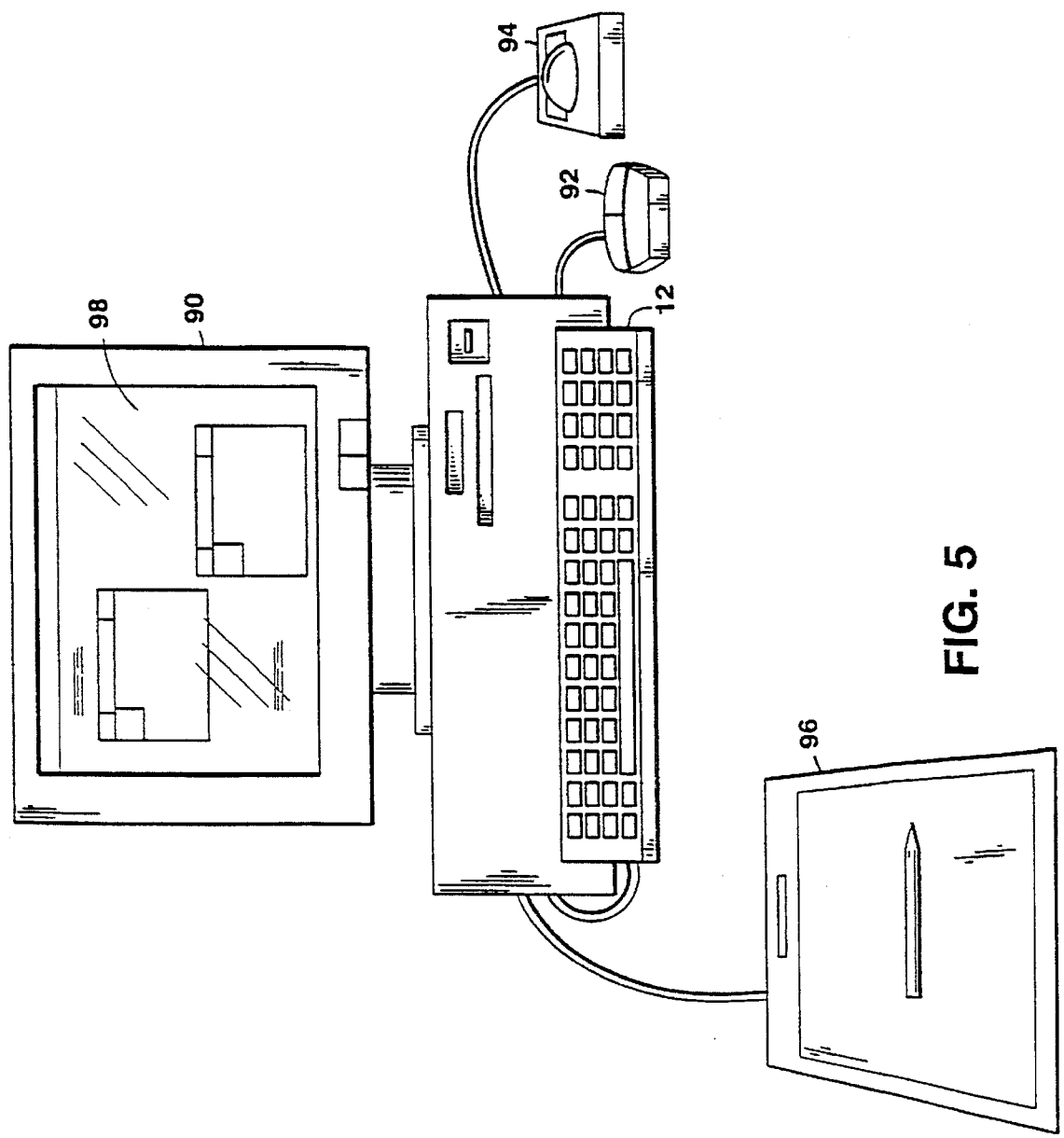
FIG. 5 is a perspective view of a personal computer.

There are also other embodiments within the scope of the following claims. For example, other kinds of sensors (capacity, stress, temperature, light) could be used instead of piezoelectric sensors. Referring to FIG. 5, other sensors could be placed at other locations on the keyboard 12 or on other parts of the computer, including the monitor 90, a mouse 92, a trackball 94, a touch pad 96, or a touch screen 98. Sensors could be placed in more than one location and the power control circuit could use signals from two or more of them to decide on what power control action to take. Various combinations of components and devices may be given reduced power, no power, full power, or other power levels, in different selectable modes. The techniques of the invention could be applied electronic devices, other than personal computers, in which user activity is intermittent. The keyboard could also be of other types, e.g., the "smart" type which contains a powered dedicated processor for keycode conversion.

What is claimed is:

1. A method for reducing power usage in a personal computer comprising repetitively performing the following sequence of steps:

a. generating a wake-up signal, using a person sensor, in connection with a user beginning to interact with the computer, b. in response to the wake-up signal, switching the computer into a first mode in which at least a first portion of the computer is switched to a more fully powered mode, and c. keeping the computer in the first mode only as long as the user is interacting with the computer, and thereafter switching the computer into a second mode in which at least the first portion is switched to a less fully powered mode and in which the amount of power delivered respectively to the first portion and a second portion of the computer are based on the periods required for the portions respectively to return to fully operational states from being less fully powered.

2. The method of claim 1 wherein the wake-up signal is generated in response to sensing an action by the user.

3. The method of claim 2 wherein the wake-up signal is generated in response to the user touching an input device of the computer.

4. The method of claim 2 wherein the action being sensed is the user approaching but not touching the computer.

5. The method of claim 2 wherein the action being sensed is the user speaking or otherwise making a noise.

6. The method of claim 2 wherein the sensing is done by detecting a voltage generated by a piezoelectric device.

7. The method of claim 3 wherein the wake-up signal is generated in response to the user touching a keyboard.

8. The method of claim 3 wherein the wake-up signal is generated in response to the user touching a track ball or a mouse.

9. The method of claim 3 wherein the wake-up signal is generated in response to the user touching a touch pad or a touch screen.

10. The method of claim 1 wherein the second mode comprises delivering a reduced level of power to a keyboard control circuit which converts keypresses to key codes.

11. The method of claim 1 wherein the second mode comprises delivering no power to a keyboard control circuit which converts keypresses to key codes.

12. The method of claim 1 wherein the second mode comprises delivering no power to controller integrated circuits, discrete logic devices, or driver circuits.

13. The method of claim 1 further comprising while the computer is in the second mode, maintaining some components of the computer at full power until a timer has elapsed and then reducing the power to those components until the wake-up signal is generated.

14. The method of claim 13 wherein the components maintained at full power are those that exhibit a delay when powered up before they are operational.

15. The method of claim 13 wherein the maintaining comprises maintaining a main microprocessor, or a hard disk motor, or a display screen at full power.

16. The method of claim 2, wherein the user is sensed by detecting capacity.

17. The method of claim 2, wherein the user is sensed by detecting stress.

18. The method of claim 2, wherein the user is sensed by detecting temperature.

19. The method of claim 2, wherein the user is sensed by detecting light.

20. A method for reducing power usage in a personal computer comprising repetitively performing the following sequence of steps:

a. generating a wake-up signal in response to a voltage generated by a piezoelectric device when a user touches a keyboard of the computer, b. in response to the wake-up signal, switching the computer into a first mode in which at least a keyboard control circuit is switched into a more fully powered mode, and c. keeping the computer in the first mode only as long as the user is interacting with the computer, and thereafter switching the computer into a second mode in which the keyboard control circuit is switched to a less fully powered mode and in which the amount of power delivered respectively to the keyboard control circuit and to a second portion of the computer are based on the periods required for the keyboard control circuit and the second portion of the computer respectively to return to fully operational states from being less fully powered.

21. A method for reducing power usage in a personal computer comprising repetitively performing the following sequence of steps:

a. generating a wake-up signal, using a piezoelectric device, in connection with a user beginning to interact with a data input device of the computer, b. in response to the wake-up signal, switching the computer into a first mode in which at least a first portion of the computer is switched to a more fully powered mode, and c. keeping the computer in the first mode only as long as the user is interacting with the computer, and thereafter switching the computer into a second mode, in which the first portion is switched to a less fully powered mode and in which the amount of power delivered respectively to the first and a second portion of the computer in the second mode are based on the period required for the portions respectively to be returned to fully operational states from being less fully powered.

* * * * *